No. 632,848. Patented Sept. 12, 1899.
J. PUTMAN.
ROTARY ENGINE.
(Application filed June 4, 1898.)
(No Model.) 2 Sheets—Sheet 1.
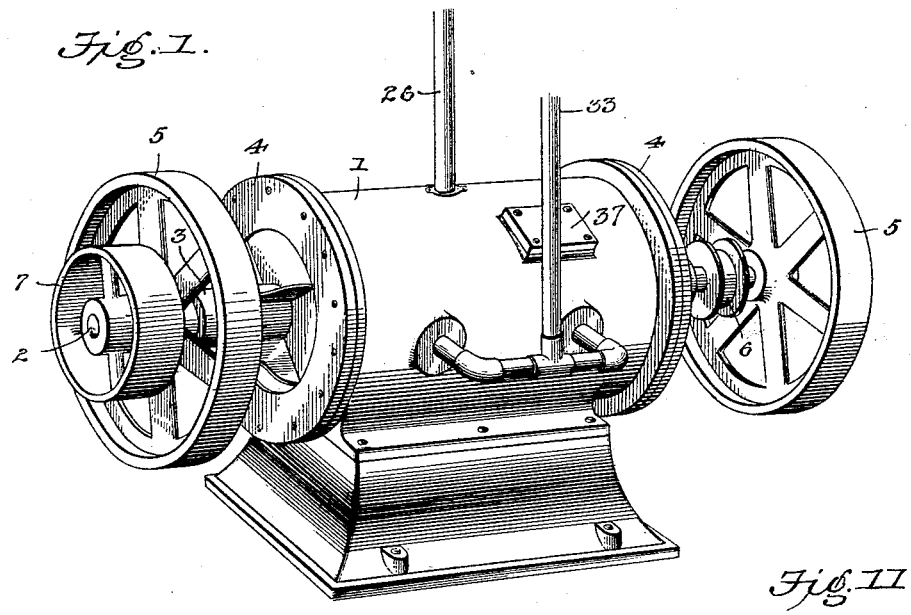
Fig. I.
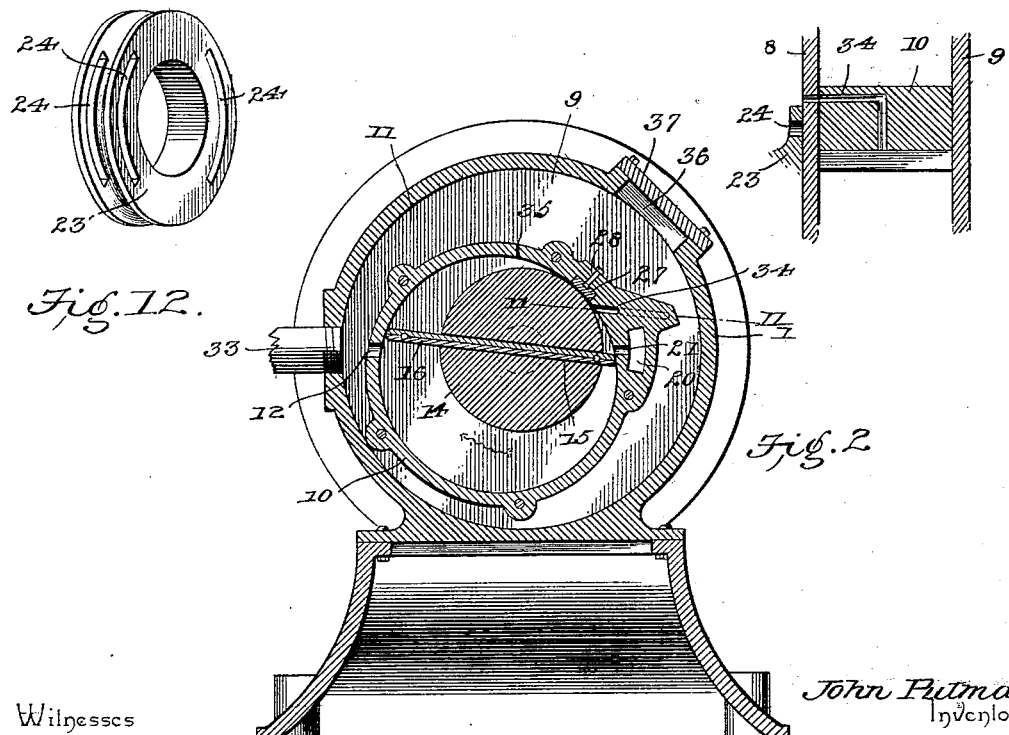
Fig. II.
Fig. 12.
Fig. 2.
Witnesses
John Putman
Inventor
By his Attorneys, No. 632,848. Patented Sept. 12, 1899.
J. PUTMAN.
ROTARY ENGINE.
(Application filed June 4, 1898.)
(No Model.) 2 Sheets—Sheet 2.

WITNESSES
A. J. Hartley
Wm. S. Graham

INVENTOR
JOHN PUTMAN
by A. Thom Attys

THE NORRIS PETERS CO., PHOTO-LITHO., WASHINGTON, D. C.

UNITED STATES PATENT OFFICE.

JOHN PUTMAN, OF LOVINGTON, ILLINOIS.

ROTARY ENGINE.

SPECIFICATION forming part of Letters Patent No. 632,848, dated September 12, 1899.

Application filed June 4, 1898. Serial No. 682,554. (No model.)

*To all whom it may concern:*

Be it known that I, JOHN PUTMAN, a citizen of the United States, residing at Lovington, in the county of Moultrie and State of Illinois, have invented a new and useful Rotary Engine, of which the following is a specification.

My invention relates to rotary engines, particularly of the eccentric-piston type, and has for its object to provide a simple, compact, and efficient construction and arrangement of parts whereby the inlet and exhaust of the motive agent are controlled to produce the maximum efficiency by avoiding compression in front or a vacuum in rear of the piston-wings.

A further object of the invention is to provide a double-cylinder engine of the type mentioned wherein boiler and expansion pressures are applied alternately, the piston of one cylinder being exposed to boiler-pressure while that of the other cylinder is exposed to expansion-pressure, whereby the impulse imparted to the moving part is due to the combined boiler and expansion pressures and whereby the application of pressure is continuous throughout a revolution of the piston to avoid dead-centers and provide for starting the engine from any point in the revolution of its piston.

Further objects and advantages of this invention will appear in the following description and the novel features thereof will be particularly pointed out in the appended claims.

Figure 3:
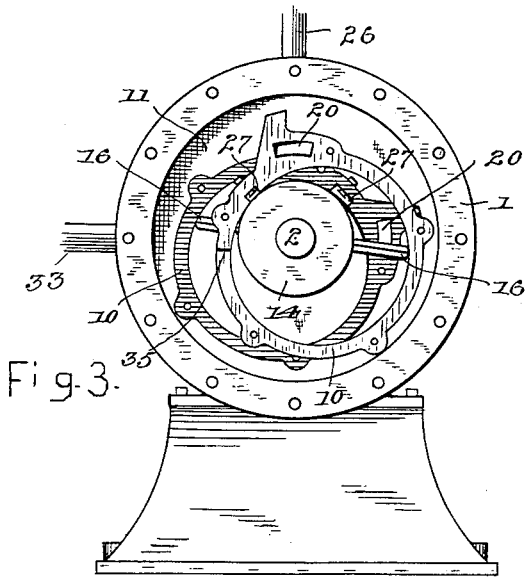
Figure 4:
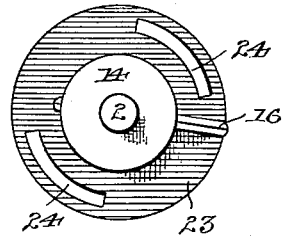
Figure 5:
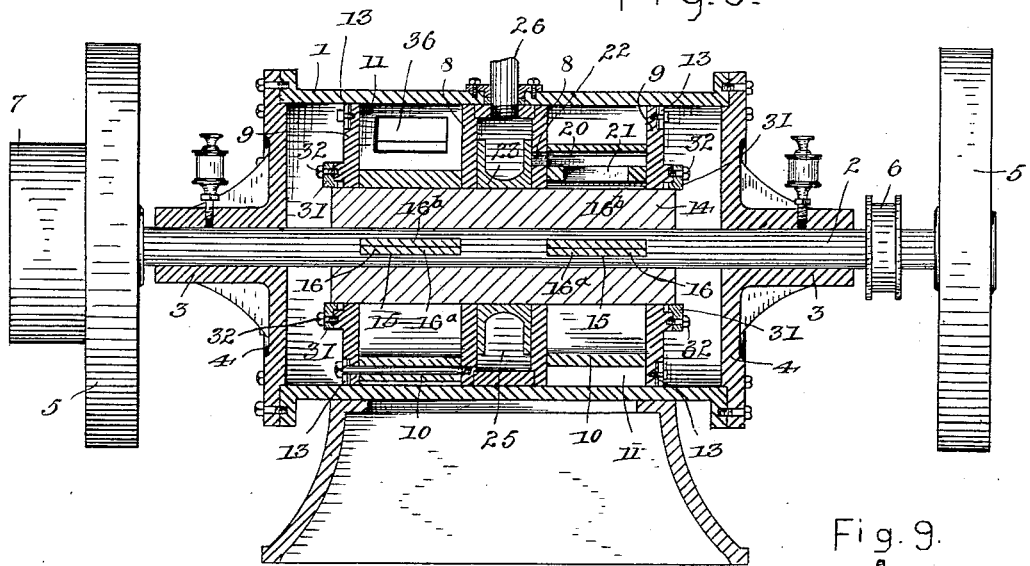
Figure 6:
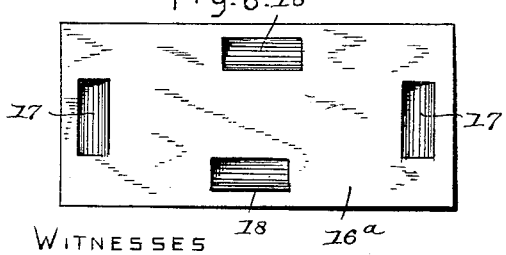
Figure 7:
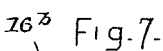
Figure 9:
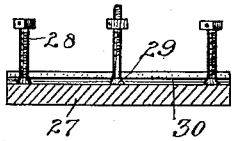
Figure 8:
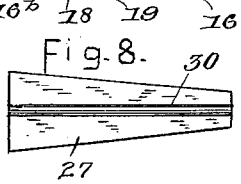
Figure 10:
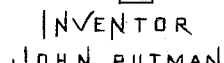

In the drawings, Figure 1 is a perspective view of an engine constructed in accordance with my invention. Fig. 2 is a transverse section of the same, taken in the plane of one of the cylinders. Fig. 3 is an end view of the casing with the head and the intermediate partitions omitted to show the relative positions of the cylinders and the ports whereby motive agent is admitted thereto. Fig. 4 is a side view of the cut-off and piston to show the relative positions of the piston-wing and cut-off ports. Fig. 5 is a longitudinal sectional view of the engine. Fig. 6 is a face view of one of the piston-wing leaves or sections. Fig. 7 is a detail sectional view of a portion of a piston-wing to show the yielding means for maintaining the leaves or sections thereof in an extended position. Fig. 8 is a detail outer side view of the gib. Fig. 9 is a longitudinal section of the gib, showing the means whereby the same is adjusted. Fig. 10 is an end view of the gib. Fig. 11 is a detail sectional view of a portion of one of the cylinders to show the auxiliary or permanently-open feed-port. Fig. 12 is a detail view of the cut-off detached.

Similar numerals of reference indicate corresponding parts in all the figures of the drawings.

1 designates a cylindrical casing, concentric with which is mounted a shaft 2 in bearings 3, formed in the casing-heads 4, said shaft being provided with fly-wheels 5 and suitable pulleys 6 and 7 or with equivalent devices, as may be preferred in practice. The interior of the casing is divided by transverse inner or contiguous and outer or remote partitions 8 and 9, said partitions being arranged in pairs, whereby between each inner partition and the adjacent outer partition is a cylindrical space, within which is arranged a cylindrical wall 10, bolted or otherwise permanently secured to the partitions 8 and 9, which constitute the heads of the cylinders, and said walls 10 are disposed eccentrically with relation to the axis of the casing and also with relation to the shaft 2, whereby the space between the cylinder-wall 10 and the casing-wall constitutes an exhaust-chamber 11 and main exhaust-port 12 in the cylinder-wall 10. The eccentric-cylinder heads 8 and 9, which, as above described, are extended beyond the wall 10 to form partitions in the main casing and also constitute the heads of the exhaust-chambers 11, are permanently secured to the casing-wall 1, and the joint between the outer or remote heads 9 and said casing-wall may be rendered steam-tight by means of suitable packing-strips 13, as shown in Fig. 5. It will be understood that the cylindrical wall 10 is arranged between the members of each pair of heads 8 and 9, and the said cylinders are arranged on the quarter, or with one in advance of the other to the extent of approximately ninety degrees, for a purpose hereinafter explained.

The piston-shaft 2 carries a piston core or hub 14, having transverse guide openings or slots 15, in which are mounted the piston slides or wings 16, one of these piston-wings being arranged to operate in each of the eccentric-cylinders 10, with its extremities in contact with the inner surface of the cylinder-wall at opposite points. The construction of piston-wing which I have shown in the drawings and which I prefer to employ in this connection is sectional, the same comprising relatively movable parallel leaves or members 16ª 16ᵇ, disposed with their inner surfaces in contact and provided with registering cross-sectionally semicylindrical grooves 17 and 18, respectively arranged transversely and longitudinally of the leaves or members and constituting spring-seats, in which are arranged the expansion coiled springs 19, to bear terminally against the extremities of the seats, and thus extend the leaves or members both longitudinally and transversely to take up lost motion due to wear between the terminal, the side edges of the wings, and the walls of the cylinder.

Each cylinder-wall 10 is provided with an enlargement, in which is formed a cavity 20, in communication, by a steam-port 21, with the interior of the eccentric cylinder, and said cavity is also in communication with a feed-port 22 formed in the inner head 8, and carried by the piston-shaft or fitted, as illustrated, upon the portion of the piston core or hub between the planes of the spaced inner heads or partitions 8 is a flanged cut-off 23, provided with inlet-ports 24, which are extended to form segmental slots for registration with the feed-ports 22. Each inlet-port 24 is of a length approximating ninety degrees of the path of the piston, although in practice they are preferably made of somewhat less length than ninety degrees, whereby "live" steam or boiler-pressure is admitted to each cylinder through somewhat less than one-fourth of a revolution of the piston. Obviously the arrangement of the two cylinders upon the quarter provides for admitting boiler-pressure, which enters the steam-chamber 25 (between the inner heads 8) through the supply-pipe 26 to the cylinders alternately, the ports 24 in the cut-off being arranged opposite to each other. Also the ports 24 are used in duplicate for each cylinder, whereby boiler-pressure is admitted to each cylinder during alternate quarters of the piston revolution. The piston core or hub is in contact with the wall of the cylinder, in which it operates at one point to form a fixed abutment, and in order to insure a steam-tight contact between the surface of the piston-core and cylinder-wall I employ a gib 27, secured in place by means of bolts 28 and adapted to be adjusted or set inwardly as the parts of the mechanism become worn in order to prevent back pressure of the motive agent. In the construction illustrated the gib is of longitudinally tapered or V shaped, with its long diameter arranged parallel with the axis of the cylinder, and hence the extremities of the piston-wings having a shorter engagement with the gib, coming in contact first with that portion of the contiguous side edge of the gib which is adjacent to the long end or base thereof. This avoids the obstruction of the piston-wing in rotation, and hence reduces the friction due to the use of the gib to the minimum. The heads 29 of the bolts which are employed to hold the gib in place are fitted in a cross-sectionally-dovetailed groove 30 in the outer side of the gib to facilitate the engagement of the bolts with the gib, allow the accurate adjustment of the gib with relation to the bolts, and provide for the displacement and subsequent replacement of the gib without entirely removing the bolts when one of the cylinder-heads has been withdrawn. Also carried by each of the outer heads 9 of the eccentric cylinders is a stuffing-box, including a gland-plate 31, held in place by gland-bolts 32 to prevent leakage of motive agent between the piston core or hub and the alined openings in the eccentric-cylinder heads.

From the above description it will be seen that boiler-pressure is maintained permanently in the feed-chamber 25 and that the cut-off, which is carried by the piston, alternately opens communication between the feed-chamber and a cylinder through the port 22, feed-cavity 20, and feed-port 21 at a point between the fixed abutment formed by the meeting surface of the piston-core to the cylinder-wall in the plane of the gib 27 and the contiguous extremity of the piston-wing to impart boiler-pressure to the piston-wing. This boiler-pressure (which, for instance, is seventy pounds) is maintained upon the piston-wing during approximately one-fourth of a revolution of the piston, although the length of time during which boiler-pressure is maintained or during which boiler-pressure is admitted may be varied to suit the requirements of the engine. When the boiler-pressure is excluded from the cylinder by the closing of the port 22 by means of the cut-off, the piston is actuated by the expansion of the motive agent through the remainder of a one-half revolution of the piston. By this time the other end of the piston-wing has reached an operative position and boiler-pressure is applied thereto. The space within the cylinder in front of that end of the piston-wing which is receiving the pressure is in open communication with the exhaust-port 12, and hence the steam or other motive agent is escaping into the exhaust-chamber 11 and from thence through an exhaust-pipe 33. The advantage of thus forming an exhaust-chamber around the cylinder is to maintain the latter at a suitable temperature to reduce to the minimum the condensation of the steam or other motive agent. During the time that the piston of one cylinder is operating under the expansion of the motive agent previously admitted the piston of the other cylinder is exposed to boiler-pressure, and hence, assuming that the expansive pressure of the motive agent is forty-eight pounds, it will be seen that the combined boiler and expansive pressures of the motive agent upon the piston is the sum of seventy and forty-eight, or one hundred and eighteen pounds. When the boiler-pressure is cut off from the second-named cylinder, it is cut into the first-named cylinder, while the piston in second-named cylinder is operating under expansive pressure. Thus throughout the revolution of the piston it is exposed to the combined boiler and expansive pressures, the one being applied to the piston of one cylinder, while the other is applied to the piston of the other cylinder.

In order to avoid back pressure, due either to compression in front of the piston-wing or vacuum in rear thereof, as during the time that the inoperative end of a piston-wing is traversing the distance between the exhaust-port and the point of contact of the piston core or hub with the cylinder-wall, or is traversing the distance between said point of contact and the feed-port 21, I employ an auxiliary feed-port 34, which is in permanent communication with the feed-chamber 25, and an auxiliary exhaust-port 35, which is in permanent communication with the exhaust-chamber 11, said auxiliary feed and exhaust ports being located upon opposite sides of the fixed abutment or the point of contact of the piston-hub with the wall of the cylinder, and respectively between the main feed and exhaust ports and said point of contact. Thus as the piston-wing leaves the point of contact in its approach to the main feed-port and before the cut-off has admitted steam-pressure to the cavity 20 the auxiliary feed-port, which is of smaller capacity, supplies motive agent directly from the feed-chamber to the space in rear of the wing. In the same way during the time that the inoperative end of the piston-wing is traversing the wall of the cylinder after passing the main exhaust-port the auxiliary exhaust-port allows pressure to be relieved into the exhaust-chamber. I do not arrange the main exhaust-port at the point indicated for the auxiliary exhaust-port, for the reason that I desire to allow sufficient time for the exhaust of the motive agent and at the same time avoid "trailing" the motive agent after it has performed its function. Hence the main exhaust-port is so disposed as to be exposed by one end of the piston-wing just before the application of pressure to the other end of the piston-wing through the main feed-port 21 and after the last-named end of the piston-wing has passed the auxiliary feed-port 34, and hence has cut out the last-named port to prevent reducing the boiler-pressure directly through the exhaust-port. It will be understood that the auxiliary feed-port is formed in the enlargement of the cylinder-casing and enters the feed-chamber at a point beyond the periphery of the cut-off. (See Fig. 11.)

In order to give access to the interior of the casing without necessitating the removal of one of the heads thereof, I provide the cylindrical wall of the casing with openings 36, fitted with removable caps 37, held in place by any suitable means, such as bolts.

Various changes in the form, proportion, and the minor details of construction may be resorted to without departing from the spirit or sacrificing any of the advantages of this invention.

Having described my invention, what I claim is—

1. A rotary engine having a cylinder divided by transverse partitions to form eccentric-piston chambers and an intermediate feed-chamber, the walls of the piston-chambers being spaced from the wall of the cylinder to form exhaust-chambers, with which the piston-chambers are in communication, connected winged pistons operating in the piston-chambers, and a cut-off carried by the piston in the feed-chamber, for controlling feed-ports in communication with said piston-chambers, substantially as specified.

2. A rotary engine having a cylinder, eccentric-piston chambers of which the heads are extended to form cylinder-partitions, between the inner of which is provided a feed-chamber, the spaces between the walls of the eccentric-piston chambers and the cylinder-wall, constituting exhaust-chambers with which the piston-chambers are in communication by exhaust-ports, connected winged pistons operating in the piston-chambers, and a cut-off actuated by the pistons for controlling feed-ports between said feed-chamber and the piston-chambers, substantially as specified.

3. A rotary engine having a cylinder, eccentric-piston chambers arranged within the cylinder and having their heads extended to form cylinder-partitions, between the inner of which is provided a feed-chamber, the intervals between the eccentric-piston-chamber walls and the cylinder-wall constituting exhaust-chambers with which said piston-chambers communicate by exhaust-ports, and the piston-chambers being arranged on the quarter, a piston having a common core or hub and wings respectively operating in the piston-chambers, and a cut-off arranged in the feed-chamber and carried by said core, for controlling feed-ports in communication with the piston-chambers, substantially as specified.

4. A rotary engine having a cylindrical casing, a piston-shaft arranged concentrically therein, outer and inner partitions arranged transversely in the casing, the inner partition being spaced apart to form an intermediate feed-chamber, eccentric-piston-chamber walls arranged between each inner partition and the adjacent outer partition and having feed-ports for connecting the feed-chamber with the piston-chamber, and exhaust-ports being formed in said piston-chamber walls for communication with the exhaust-chambers, consisting of the spaces between said piston-chamber walls and the casing, pistons operating in the piston-chambers, and a cut-off actuated by the piston-shaft for controlling the feed-ports of the piston-chambers, substantially as specified.

5. A rotary engine having a feed-chamber, a piston-chamber provided in its wall with spaced permanently-open main and auxiliary exhaust-ports, a piston operating in the piston-chamber, spaced main and auxiliary feed-ports, of different cross-sectional areas, for connecting the piston-chamber with the feed-chamber, the piston-wing being adapted to pass the auxiliary and main feed-ports successively in its forward movement, and a cut-off actuated by the piston for controlling the main feed-port, substantially as specified.

6. A rotary engine having coaxial feed and exhaust chambers, an eccentric-piston chamber arranged within the exhaust-chamber and having in its wall an exhaust-port in communication with the exhaust-chamber, main and auxiliary feed-ports of different cross-sectional areas for connecting the piston-chamber with the feed-chamber, a piston arranged in the piston-chamber, and a cut-off actuated by the piston for controlling the main feed-port, substantially as specified.

7. A rotary engine having a cylinder, a piston, a valve-controlled main feed-port in communication with the cylinder, and a permanently-open auxiliary feed-port, of less cross-sectional area than the main feed-port, in communication with the cylinder at a point in advance of the main feed-port, whereby it is passed by a piston-wing before said wing reaches the main feed-port, substantially as specified.

8. A rotary engine having a cylinder provided with feed and exhaust ports, a piston having wings for traversing the wall of the cylinder, and a gib arranged in the wall of the cylinder between the feed and exhaust ports, that edge of the gib with which the piston-wing first comes in contact in its advance movement, being disposed obliquely to the path of movement of the piston-wing, substantially as specified.

9. A rotary engine having a cylinder, an eccentric winged piston having its core in contact at one point with the wall of the cylinder, and a gib arranged at the point of contact of the piston-core and cylinder-wall, said gib being tapered longitudinally to present an obliquely-disposed edge for contact with the contiguous edges of the piston-wing, substantially as specified.

10. A rotary engine having a cylinder, an eccentric-piston having its core arranged at one point in contact with the wall of the cylinder, a longitudinally-tapered gib arranged at the point of contact of the piston-core with the cylinder-wall and provided with a longitudinal cross-sectionally-dovetailed groove, and headed securing-bolts engaging said groove, and extending outwardly through the wall of the cylinder, substantially as specified.

In testimony that I claim the foregoing as my own I have hereto affixed my signature in the presence of two witnesses.

JOHN PUTMAN.

Witnesses:
A. R. PIFER,
LOUIS BEY.